United States Patent Office 3,065,411
Patented Nov. 20, 1962

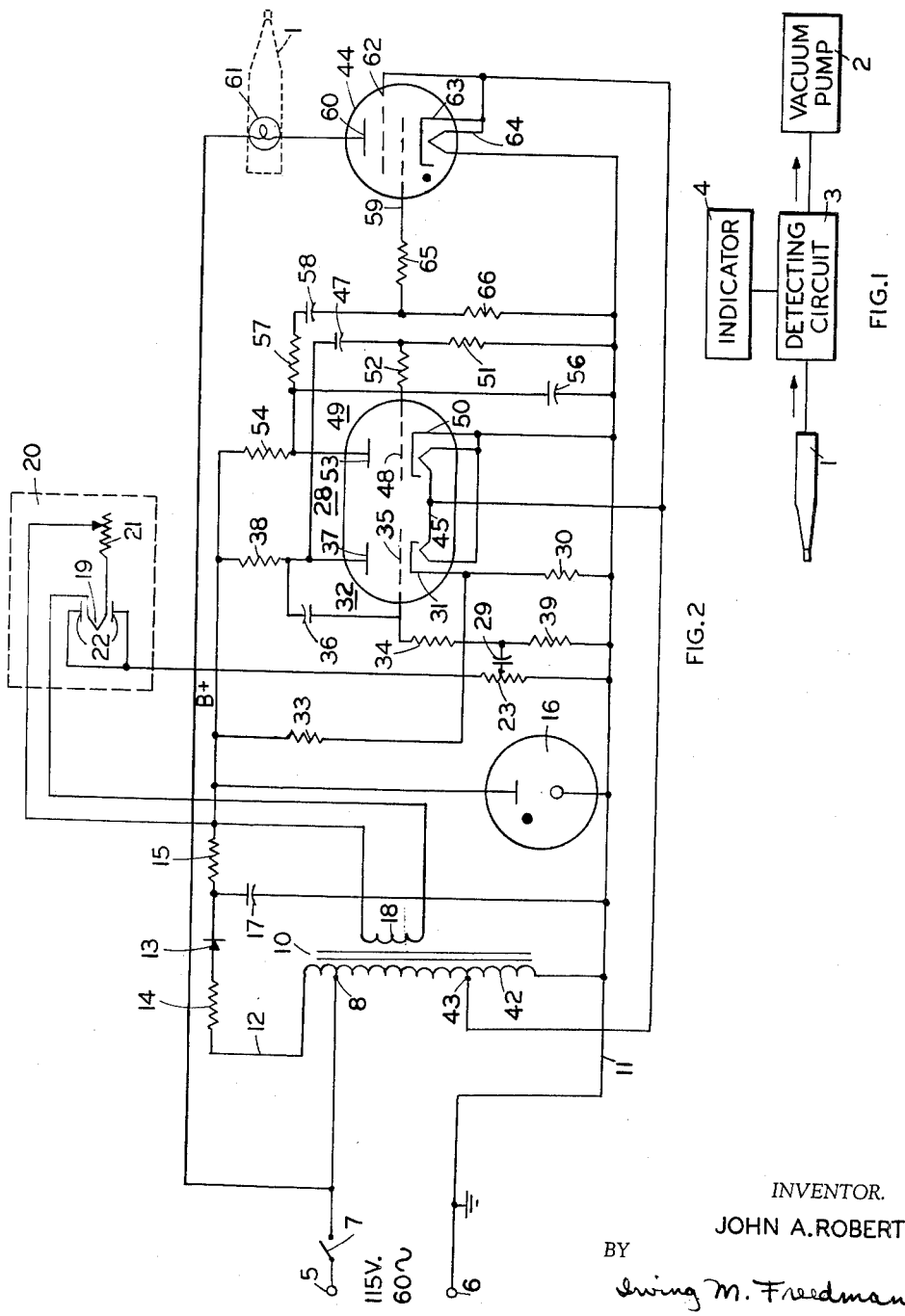

3,065,411
LEAK DETECTOR INDICATING CIRCUIT
John A. Roberts, Lynnfield Center, Mass., assignor to General Electric Company, a corporation of New York
Filed May 25, 1959, Ser. No. 815,637
9 Claims. (Cl. 324—33)

This invention relates to improvements in electrical vapor or leak detector indicating circuits of the type described in U.S. Patent 2,550,498, granted April 24, 1951, on application Serial No. 754,657, filed June 14, 1947, by Chester W. Rice, and assigned to the same assignee as the present application, for detecting the presence of certain substances or impurities in gases.

The aforesaid patent shows the use of a direct current microammeter to display variations of current produced by the presence of substances or impurities to which the detector is sensitive.

It is an object of this invention to provide an improved leak detector detecting circuit which provides a visual leak indication.

It is another object of this invention to provide an improved leak detector circuit which provides a leak indication only upon an increase of tracer gas or substance to which the detector is sensitive.

It is yet another object of this invention to provide an improved leak detector indicating circuit which readily distinguishes and indicates differences in leak magnitudes.

It is still another object of this invention to provide improved sensitivity in a leak detector indicating circuit to enable the indication of small leaks.

Further objects and advantages of the invention will become apparent as the following description proceeds and the features of novelty which characterize the invention will be pointed out with particularity in the claims annexed to and forming a part of this specification.

In accordance with one form of the invention, a leak detector circuit is provided which is capable of indicating both the occurrence and relative magnitude of changes of the input variable being detected. A first circuit is biased to a first state of conduction and may be set into damped oscillations by a change of the input variable. The oscillations are coupled to a control circuit which is normally biased to a non-conducting condition and which includes a lamp or other indicator.

The oscillations are used to overcome the bias and cause conduction of the control circuit with the indicator displaying such conduction as an indication of a change of input variable or leak.

More particularly, means are provided by which the amplitude of the oscillations for a given change of input variable may be adjusted so that the oscillations produced by a large change of variable will overcome the control circuit bias a plurality of times whereas the damped oscillation produced by a relatively small change of input variable will overcome the control tube bias a lesser number of times and so produce fewer indications. The number of indications may thus be used as a measure of the magnitude of the leak.

For a better understanding of this invention, reference may be had to the following specification, taken in view of the accompanying drawings in which:

FIG. 1 is a schematic representation of a leak detector system shown in block diagram form and incorporating the subject invention; and FIG. 2 is a schematic diagram of the detecting and indicating circuits of FIG. 1.

Referring to FIG. 1, a leak detector system is shown of the general type described in the aforesaid Rice patent. Samples of the atmosphere from the area suspected of leakage are drawn by probe 1 to the detecting circuit 3 through the action of vacuum pump 2. Detecting circuit 3 includes a vapor detector the ionization of which varies in accordance with the concentration of certain gases or vapors introduced thereto. Variations of ionization are reflected in variations of current flow and an increase of current flow is utilized to indicate the presence of a leak on indicator 4.

Probe 1 may be of the type described in my copending patent application, Serial No. 793,903, filed February 17, 1959, and assigned to the same assignee as the present invention, and now Patent No. 2,996,661.

The detecting circuit 3 and indicator 4 are shown in detail in FIG. 2. Referring to FIGURE 2, A.C. power is applied to terminals 5 and 6 through power switch 7 to the tap 8 and grounded end 11 of the primary side of transformer 10. The entire primary of transformer 10 functions as an autotransformer to provide a stepped-up A.C. voltage between end 11 and the opposite end 12. The stepped-up voltage is utilized to provide a B+ or direct current voltage through the half-wave rectifying action of diode 13 in series with surge-limiting resistor 14. Capacitor 17 connected between the diode 13 and ground line 11 is charged to 200 volts, substantially the peak of the rectified voltage. A regulated B+ voltage of approximately 150 volts D.C. is provided by the regulating action of the series combination of resistor 15 and voltage regulator tube 16 connected across capacitor 17.

The secondary 18 of transformer 10 supplies a voltage of approximately 1.5 volts to the filament 19 and resistor 21 of vapor detecting element or detector 20. Variable resistor 21 in the filament 19 supply line controls the magnitude of current flow therethrough. Vapor detector 20 may be of the type described in my copending patent application, Serial No. 810,476, filed May 1, 1959, and assigned to the same assignee as the subject application, and now Patent No. 3,009,074. The ion collector electrode 22 which surrounds the filament or ion source 19 is connected through variable resistor 23 to the ground line 11. One side of the filament 19 is connected through the filament adjusting resistor 21 to the B+ voltage such that the collector 22 of the vapor detector 20 is negative with respect to the ion source 19.

In a manner more fully described in the aforesaid Rice patent and in my aforesaid patent applications, leaks are detected, for example, by probing regions suspected of leakage with probe 1 to detect the presence outside a container of tracer gases introduced inside the container. The tracer gas is usually one to which the detector 20 is especially responsive, such as gases containing a member of the halogen family. Samples of the atmosphere in the region probed are drawn between ion source 19 and ion collector 22 by vacuum pump 2, and the introduction of tracer gas from a leak greatly increases the degree of ionization of detector 20 and produces an avalanche of positive ions from source 19. The positive ions are collected by collector 22 and result in increased current flow in the circuit including variable resistor 23 and a decrease in the voltage developed across the resistor.

A selected portion of the voltage variations appearing across the ends of variable resistor 23 is coupled to the amplifier 28 by coupling capacitor 29. Coupling capacitor 29 isolates the indicating and amplifying circuitry from gradual variations or current flow through resistor 23. Such gradual variations of current flow result from variations in the level of background or accumulated tracer gas in the area being probed. Only sudden changes in the magnitude of tracer gas, such as are caused by a leak, will be coupled to tube 28.

Resistor 30, connected between ground line 11 and the cathode 31 of the first-stage triode 32 of twin-triode amplifier-oscillator tube 28, and resistor 33, connected between the cathode and B+, functions as a voltage divider to bias the cathode at a positive potential such that triode 32 normally operates at cut-off or nearly at cut-off. Resistor 34 in the grid circuit of triode 32 limits the current which may be drawn by grid 35. Capacitor 36 connected between the plate 37 and grid 35 provides a negative feed-back path for undesirable alternating current signals which may be picked up by the triode amplifier 32. Such undesirable signals are fed back to the grid 35 180° out of phase and tend to cancel themselves out. Load resistor 38 is connected between the plate 37 and the B+ supply. Resistor 39 is connected between the grid 35 and ground to maintain the grid at circuit ground potential except during the presence of a leak signal and also to provide a leakage path through which capacitor 29 may discharge.

Portion 42 of the primary of transformer 10 between tap 43 and ground line 11 provides approximately 6.3 volts as a filament supply. The filament supply is applied between the ends and the center tap of filament 45 of tube 28.

Upon the occurrence of a leak signal, the increasing voltage developed across variable resistor 23 is coupled through capacitor 29 to produce a proportionate signal voltage across resistor 39 and drive grid 35 in a positive direction. The leak signal voltage overcomes the effective steady-state, negative grid-bias provided by the voltage divider action of resistors 30 and 33 and triode 32 conducts in accordance with the leak signal. The amplified leak signal appearing at plate 37 is coupled by capacitor 47 to the grid 48 of triode 49.

Under steady-state conditions in the absence of a leak signal, triode 49 is normally conducting since the grid 48 is maintained at the potential of cathode 50 by grid resistor 51 connected between the grid and the cathode. Grid current is limited by the grid limiting resistor 52. Capacitor 56 by-passes to ground line 11 undesirable alternating current signals that have passed through the amplifier 28 as well as "hash" or high-frequency voltage variations appearing at plate 53.

Under steady-state conditions and with triode 49 fully conducting, plate 53 is at a voltage considerably less than the B+ supply through the drop which occurs in plate load resistor 54. Leak signals coupled from triode 32 by capacitor 47 develop a signal voltage across resistor 51 which drives grid 48 in a negative direction, limiting the current flow through triode 49 such that plate 53 becomes more positive. The signal variations occurring at plate 53 are coupled by resistor 57 and capacitor 58 to the grid 59 of gaseous control tube 44. Resistor 57 attenuates undesirable A.C. components and "hash" and also limits the current to grid 59.

Control tube or thyratron 44 is normally maintained in a cut-off or non-conducting state in the absence of a leak signal. The plate 60 of thyratron 44 is connected through incandescent lamp 61 to tap 8 of the primary of transformer 10 or one side of the input power line. The screen grid 62, cathode 63, and one side of the filament 64 of control tube 44 are connected together and to tap 43 on the primary of transformer 10. The control grid 59 is connected to the other side of the filament winding, or ground line 11, through resistors 65 and 66. Resistor 65 also acts as a grid-current limiting resistor while resistor 66 provides a discharge path to ground line 11 for capacitor 58. The net result of the phase relationships of the A.C. voltages applied to thyratron 44 is to bias the grid such that the thyratron is normally cut off.

Under steady-state or no leak signal conditions, the entire circuit described above operates as follows: triode 32 is biased to cut off because of the positive bias applied to cathode 31 from the voltage divider comprising resistors 30 and 33, triode 49 is at maximum conduction, and thyratron 44 is cut off because of the A.C. grid bias. When tracer gas is drawn in through probe 1, as a leak is probed, to the region between the ion source 19 and the ion collector 22, the ionization within detector 20 increases. An avalanche of positive ions released from the ion source 19 is collected by the relatively negatively charged ion collector 22. Electron current flow in the external circuit of detector 20 develops a signal voltage across variable resistor 23, a portion of which is coupled through capacitor 29 to the grid circuit of triode 32. The leak signal voltage drives grid 35 in a positive direction such that triode 32 conducts more, driving plate 37 in a negative or less positive direction. The resultant drop of voltage at plate 37 is coupled through capacitor 47 to grid 48 of triode 49, driving the grid in a negative direction. Triode 49 conducts less, driving plate 53 in a positive direction to approach the B+ voltage. The voltage rise of plate 53 is coupled through capacitor 58 to grid 59 of thyratron 44, overcoming the A.C. bias, and causing the thyratron to conduct. Current flow in the plate circuit of thyratron 44 causes the lamp 61 to light as a leak indication. Indicator lamp 61 is supplied directly from the power line so that the transformer 10 is not burdened by current flow through the thyratron 44 and feed-back from the thyratron is minimized.

Each time a leak signal occurs, a damped oscillation is started in tube 28; that is, the signal coupled through capacitor 58 from tube 28 goes first in a positive and then in a negative direction with each signal peak being of considerably less magnitude than the preceding one. It is believed that the oscillation of amplifier 28 is caused by large signal overshoots through the action of the plurality of RC circuits and the overload characteristics of the triodes 32 and 49, including grid current flow, in the presence of large signals.

The oscillations produced by amplifier 28 are of a relatively low frequency as compared with the 60-cycle supply for control tube 44. A single positive alternation of the signal output of amplifier 28 in the presence of a leak will overcome the bias of control tube 44 over a period of a plurality of cycles of the 60-cycle supply. Control tube 44 will therefore be triggered repeatedly into conduction at a repetition rate of 60 times a second during the period that the bias is overcome. The operator, however, is not able to discern between individual conductions during this period and the lamp for practical purposes emits only a single sustained flash. Similarly, other indicator devices, such as relay operated buzzers or electric instruments, if used in place of lamp 61, would not follow the plural conductions and would give a single leak indication during the period of one-half second or more that the signal output of amplifier 28 overcomes the bias of the control tube. For purposes of this application, such action will be considered to be a single leak indication.

The negative alternation or swing of the signal coupled from amplifier 28 will prevent conduction of control tube 44 and lamp 61 will be extinguished. However, the lamp 61 will again emit a flash if the next positive alternation is of sufficient amplitude to overcome the bias of control tube 44. The signal coupled through capacitor 58 by small or medium leaks will be such that only the first peak will be high enough to trigger a single flash of the leak indicator lamp 61; while the signal provided by very large leaks will include succeeding positive peaks high enough to trigger the thyratron a plurality of times and cause a second or more successive flashes. Variable resistor 23 may therefore be adjusted to provide only a single flash for a small or medium leak, and the number of flashes produced by lamp 61 will indicate distinctions between small or medium and large leaks.

The operation of the circuit is such that the first leak indication occurs when the probe 1 is moved toward a leak and the concentration of tracer gas drawn to detector 20 increases. The second or successive flashes occur when the probe is moved away from the leak such that the concentration of tracer gas decreases. In normal leak detector probing, the probe is moved slowly by points suspected of leakage such that change of concentration of tracer gas for a leak indication is as a momentary change of the nature described above.

When the probe 1 has been moved away from the region of the leak, the circuit reverts to the steady state condition as follows: The voltage variations across resistor 23 due to the leak cease and the charge accumulated across capacitor 29 discharges through resistor 39 and the portion of resistor 23 between the arm and ground. The cathode bias provided by resistors 30 and 33 again resumes control and triode 32 ceases to conduct. Plate 37 of triode 32 then approaches the B+ voltage; and in the absence of a signal coupled through capacitor 47 from plate 37, triode 49 again becomes conducting. Since voltage variations no longer exist at plate 53 of triode 49, no A.C. signal is present to be coupled through capacitor 58 to overcome the bias of thyratron 44.

Subsequent movements of the probe 1 toward the leak area in order to localize the leak would again result in increases of tracer gas with resultant leak indications in a manner described above.

The following table lists the value of the circuit components associated with amplifier 28 which have been found to be desirable:

| Part designation: | Value (K=1000) |
|---|---|
| 23 | 2 Megohms. |
| 28 | Type 12AX7 tube. |
| 29 | .33 mf. |
| 30 | 820 ohms. |
| 33 | 56K ohms. |
| 34 | 470K ohms. |
| 36 | .0068 mf. |
| 38 | 220K ohms. |
| 39 | 4.7 megohms. |
| 44 | Type 2D21 tube. |
| 47 | .33 mf. |
| 51 | 1.8 megohms. |
| 52 | 470K ohms. |
| 54 | 220K ohms. |
| 56 | .33 mf. |
| 57 | 470K ohms. |
| 58 | .33 mf. |
| 65 | 470K ohms. |
| 66 | 470K ohms. |

Incandescent lamp 61 may conveniently be located in a transparent section of probe member 1 in a manner more clearly shown in my copending patent application, Serial No. 793,903. One advantage of such an arrangement is that the operator when probing regions suspected of leakage need only watch the probe that he is handling rather than watching an electric instrument which is usually positioned within the equipment cabinet located remotely from the probe.

While particular embodiments of the invention have been illustrated or described, various changes and modifications thereof may be made by one skilled in the art without departing from the spirit and scope of the invention as set forth in the appended claims.

What I claim as new and desire to secure by Letters Patent of the United States is:

1. For use in a leak detector circuit responsive to changes of an input variable, the magnitude of said input variable being proportional to the magnitude of the leak being detected, a first circuit biased to a first state of conduction, means to cause damped oscillations of said first circuit in accordance with a change of said input variable upon the detection of a leak, the amplitude of said oscillations being related to the magnitude of said variable, a control circuit, means to couple the oscillations of said first circuit to said control circuit, said control circuit being responsive to oscillations coupled thereto which exceed a predetermined minimum amplitude, and an indicator responsive to variations in the conduction of said control circuit caused by said oscillations which exceed said minimum amplitude to provide leak indications the amount of which indication is related to the magnitude of the leak being detected.

2. For use in a leak detector circuit responsive to changes of an input variable, a first circuit biased to a first state of conduction, means to cause damped oscillations of said first circuit in accordance with a change of said input variable, the magnitude of said input variable being proportional to the magnitude of the leak being detected, the amplitude of said oscillations being related to the magnitude of said variable, a control circuit, means to couple the oscillations of said first circuit to said control circuit, said control circuit being biased so as to be non-conducting in the absence of said oscillations and to become conducting in response to oscillations coupled thereto which overcome said bias, and an indicator responsive to the conduction of said control circuit to indicate the presence and relative magnitude of the leak being detected by the amount of indications resulting.

3. For use in a leak detector circuit responsive to changes of an input variable, a first circuit biased to a first state of conduction, means to cause damped oscillations of said first circuit in accordance with a change of said input variable, the magnitude of said input variable being related to the magnitude of the leak being detected the amplitude of said oscillations being related to the magnitude of said variable, a control circuit, means to couple the oscillations of said first circuit to said control circuit, said control circuit being biased so as to be non-conducting in the absence of said oscillations and to become conducting in response to oscillations coupled thereto which overcome said bias, an indicator responsive to conduction of said control circuit, and means to adjust the amplitude of said oscillations for a given change of said input variable such that the number of indications produced by a large change of variable is different than that produced by a relatively small change of variable.

4. For use in a leak detector circuit responsive to changes of an input variable, a first circuit biased to a first state of conduction, means to cause damped oscillations of said first circuit in accordance with a change of said input variable, the amplitude of said oscillations being related to the magnitude of said variable, a control circuit, means to couple the oscillations of said first circuit to said control circuit, said control circuit being biased so as to be non-conducting in the absence of said oscillations and to become conducting in response to oscillations coupled thereto which overcome said bias, an indicator lamp responsive to conduction of said control circuit, a probe for localizing the source of said variable, said lamp being located within said probe, and means to adjust the amplitude of said oscillations for a given change of said input variable such that the number of indications produced by a large change of variable is different than that produced by a relatively small change of variable.

5. For use in a leak detector circuit responsive to changes of an input variable, a first circuit biased to a first state of conduction, means to cause damped oscillations of said first circuit in accordance with changes of said input variable, the amplitude of said oscillations being related to the magnitude of said changes, a control circuit, means to couple the oscillations of said first circuit to said control circuit, said control circuit including a gaseous tube biased so as to be non-conducting in the absence of said oscillations and to become conducting in response to oscillations coupled thereto which overcome said bias, said gaseous tube being energized by an alternating current signal applied to the conduction circuit thereof, and an indicator in circuit with said tube and responsive to conduction of said control circuit.

6. For use in a leak detector circuit responsive to changes of an input variable, a first circuit biased to a first state of conduction, means to cause damped oscillations of said first circuit in accordance with changes of said input variable, the amplitude of said oscillations being related to the magnitude of said changes, a control circuit, means to couple the oscillations of said first circuit to said control circuit, said control circuit including a gaseous tube biased so as to be non-conducting in the absence of said oscillations and to become conducting in response to oscillations coupled thereto which overcome said bias, and an indicator in circuit with said tube and responsive to conduction of said control circuit, the bias for said control tube being provided by connections adapted to connect the plate thereof to one side of an alternating current source, the grid to the other side of said source, and the cathode to an intermediate point thereof.

7. For use in a leak detector circuit responsive to changes of an input variable, a first circuit biased to a first state of conduction, means to cause damped oscillations of said first circuit in accordance with changes of said input variable, the amplitude of said oscillations being related to the magnitude of said changes, a control circuit, means to couple the oscillations of said first circuit to said control circuit, said control circuit including a gaseous tube biased so as to be non-conducting in the absence of said oscillations and to become conducting in response to oscillations coupled thereto which overcome said bias, a lamp in circuit with said tube and responsive to conduction of said control circuit, said lamp emitting a flash for each alternation of said oscillation which overcomes said bias, and means to adjust the response of said control signal to a given change of input variable such that the number of flashes produced by a large change of variable is different than that produced by a relatively small change of variable.

8. For use in a leak detector circuit responsive only to changes of an input variable, the magnitude of said input variable being proportional to the magnitude of the leak being detected, a first circuit biased to a first state of conduction, means to vary the conduction of said first circuit in accordance with changes of said input variable, said variation of conduction providing repetitive pulses of decreasing magnitude, a control circuit, means to couple said pulses of said first circuit to said control circuit, and an indicator responsive to said pulses of said control circuit caused by said variations of said first circuit, said indicator providing a pulsed output the number of pulses of which indicates the relative magnitude of the leak being detected.

9. For use in a leak detector circuit responsive only to changes of an input variable, the magnitude of said input variable being proportional to the magnitude of the leak being detected, a first circuit biased to a first state of conduction, means to vary the conduction of and provide pulses from said first circuit in accordance with changes of said input variable, a control circuit, means to couple said pulses of said first circuit to said control circuit, said coupling means including a capacitor, and an indicator responsive to variations of conduction of said control circuit caused by said variations of said first circuit to provide a pulsed indication which is related to the magnitude of the leak being detected.

References Cited in the file of this patent

UNITED STATES PATENTS

| 2,806,181 | Rockafellow | Sept. 10, 1957 |
| 2,844,781 | Adelman et al. | July 26, 1958 |
| 2,873,425 | Huggins | Feb. 10, 1959 |